(12) United States Patent
Muijs et al.

(10) Patent No.: US 9,479,251 B2
(45) Date of Patent: Oct. 25, 2016

(54) LIGHT DETECTION SYSTEM AND METHOD

(71) Applicant: KONINKLIJKE PHILIPS N.V., Eindhoven (NL)

(72) Inventors: Remco Theodorus Johannes Muijs, Meteren (NL); Frederik Jan De Bruijn, Eindhoven (NL); Tommaso Gritti, Breda (NL); Stephanus Joseph Johannes Nijssen, Eindhoven (NL); Lorenzo Feri, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/426,821

(22) PCT Filed: Sep. 2, 2013

(86) PCT No.: PCT/IB2013/058210
§ 371 (c)(1),
(2) Date: Mar. 9, 2015

(87) PCT Pub. No.: WO2014/037866
PCT Pub. Date: Mar. 13, 2014

(65) Prior Publication Data
US 2015/0249496 A1    Sep. 3, 2015

Related U.S. Application Data

(60) Provisional application No. 61/698,761, filed on Sep. 10, 2012.

(51) Int. Cl.
*H04B 10/00* (2013.01)
*H04B 10/04* (2006.01)
(Continued)

(52) U.S. Cl.
CPC .......... *H04B 10/116* (2013.01); *H05B 33/0863* (2013.01); *H05B 37/0272* (2013.01); *H04B 10/114* (2013.01)

(58) Field of Classification Search
USPC ......................................................... 398/127
See application file for complete search history.

(56) References Cited

U.S. PATENT DOCUMENTS

| 4,807,031 A * | 2/1989 | Broughton ............. A63H 30/04 348/460 |
| 8,248,467 B1 * | 8/2012 | Ganick ................ G01C 21/206 340/13.24 |

(Continued)

FOREIGN PATENT DOCUMENTS

| NL | WO 2009010926 A2 * | 1/2009 | ......... H05B 37/0272 |
| NL | 2503852 A1 * | 9/2012 | ......... H05B 37/0272 |

(Continued)

OTHER PUBLICATIONS

Danakis et al., Using a CMOS Camera Sensor for Visible Light Communicaiton, IEEE, 2012, pp. 1244-1248.*

*Primary Examiner* — Ken N Vanderpuye
*Assistant Examiner* — Jai Lee
(74) *Attorney, Agent, or Firm* — Meenakshy Chakravorty

(57) ABSTRACT

There is provided a method for detecting modulated light comprising: receiving a set of images acquired by means of a rolling shutter camera having image acquisition settings comprising a frame rate, $f_{frame}$, and a line rate, $f_{line}$; identifying in consecutive frames of said images—a pattern governed by the ratio between a modulation frequency, fc, of a modulated light source and the line rate, $f_{line}$, and—between consecutive frames a spatial shift of said pattern governed by the ratio between said modulation frequency fc, and said frame rate, $f_{frame}$; and providing based on said pattern and spatial shift thereof, an estimate of the modulated light amplitude from said light source.

14 Claims, 12 Drawing Sheets

(51) Int. Cl.
   *H04B 10/116*   (2013.01)
   *H05B 37/02*    (2006.01)
   *H05B 33/08*    (2006.01)
   *H04B 10/114*   (2013.01)

(56) References Cited

U.S. PATENT DOCUMENTS

| | | | |
|---|---|---|---|
| 2008/0122607 A1 | 5/2008 | Bradley | |
| 2010/0172651 A1* | 7/2010 | Nien | H04B 10/1141 |
| | | | 398/135 |
| 2013/0027576 A1* | 1/2013 | Ryan | H04N 5/3532 |
| | | | 348/222.1 |
| 2013/0195273 A1* | 8/2013 | Lord | H04L 63/0428 |
| | | | 380/270 |
| 2015/0147067 A1* | 5/2015 | Ryan | H04B 10/116 |
| | | | 398/118 |
| 2015/0323311 A1* | 11/2015 | Muijs | G01B 11/162 |
| | | | 356/28.5 |
| 2016/0164603 A1* | 6/2016 | De Bruijn | H04B 10/116 |
| | | | 398/118 |

FOREIGN PATENT DOCUMENTS

| | | | | |
|---|---|---|---|---|
| NL | EP 2503852 A1 * | 9/2012 | ......... | H05B 37/0272 |
| WO | 2011086501 A1 | 7/2011 | | |
| WO | 2011086517 A1 | 7/2011 | | |

* cited by examiner

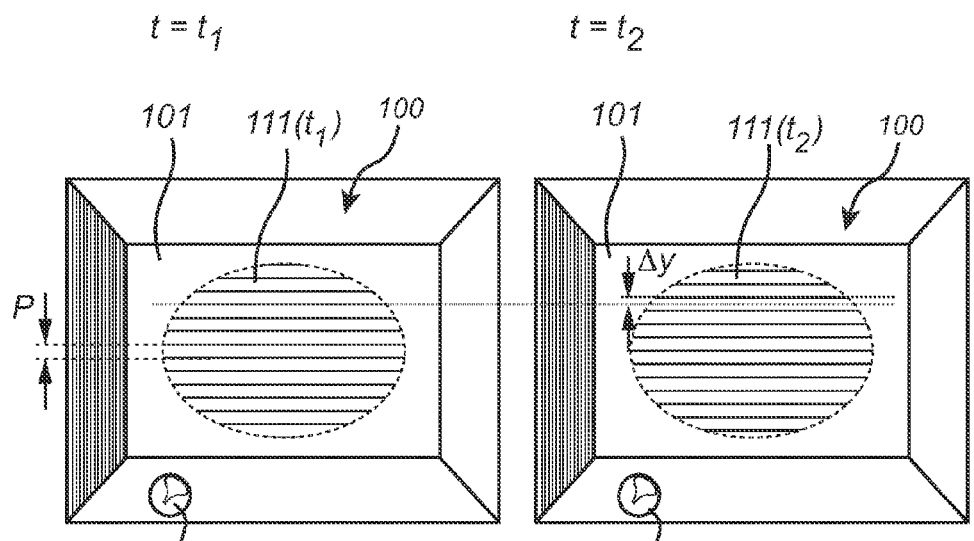
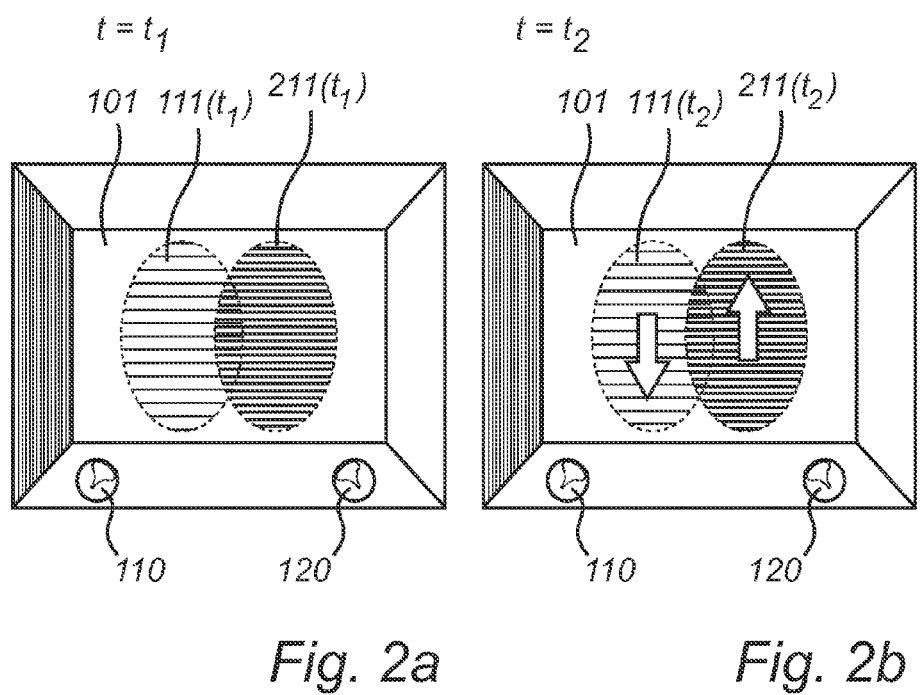

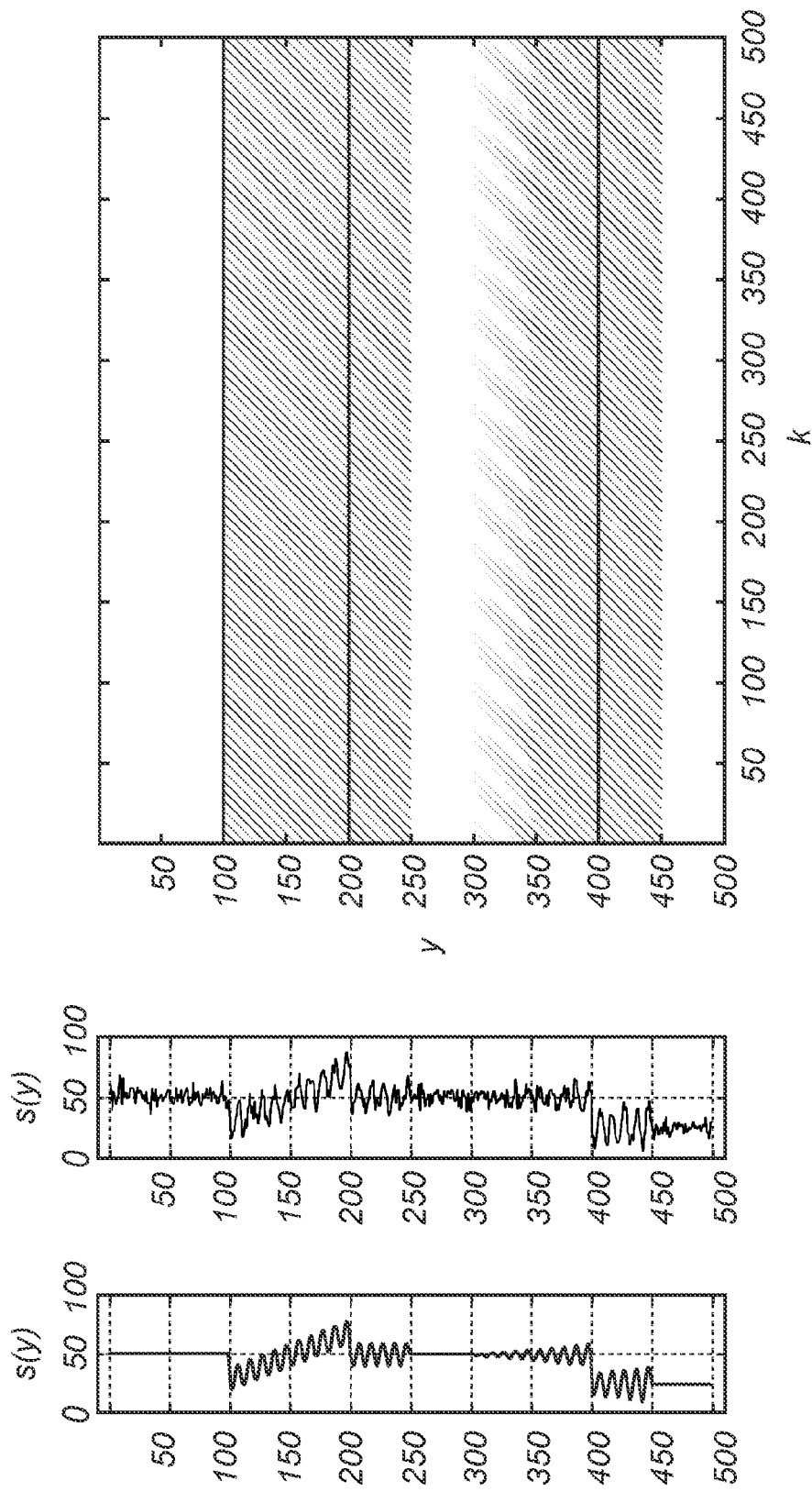

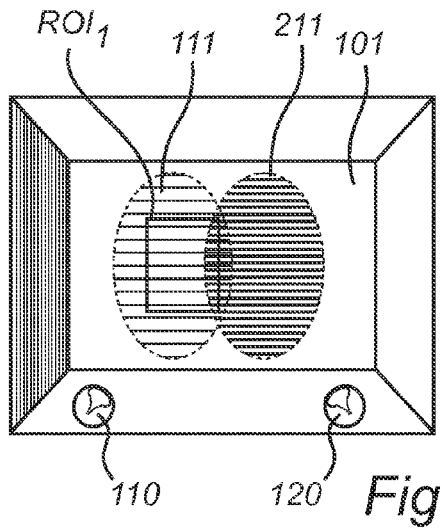 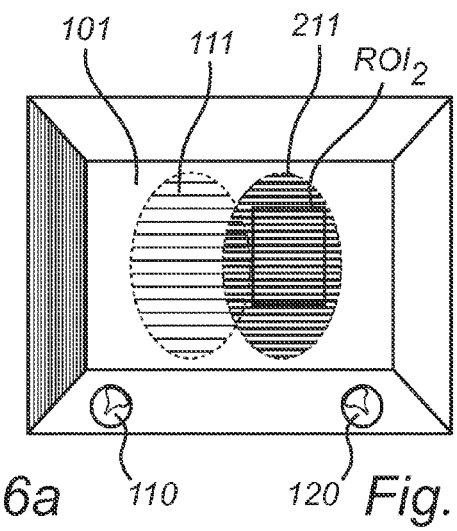
Fig. 6a    Fig. 6b
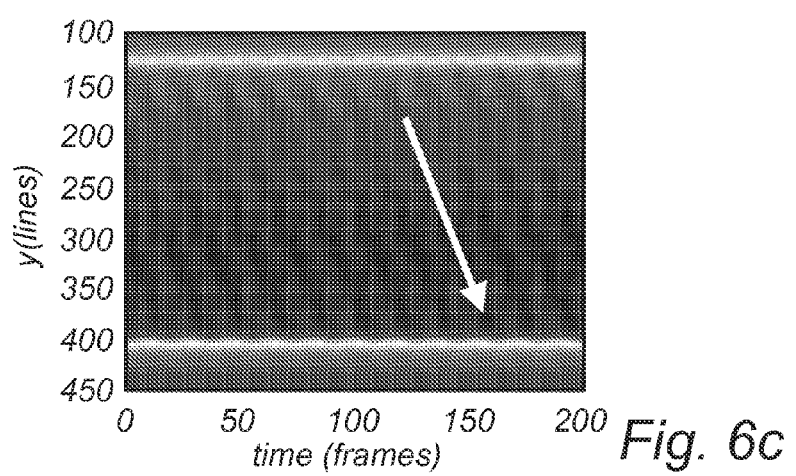
Fig. 6c
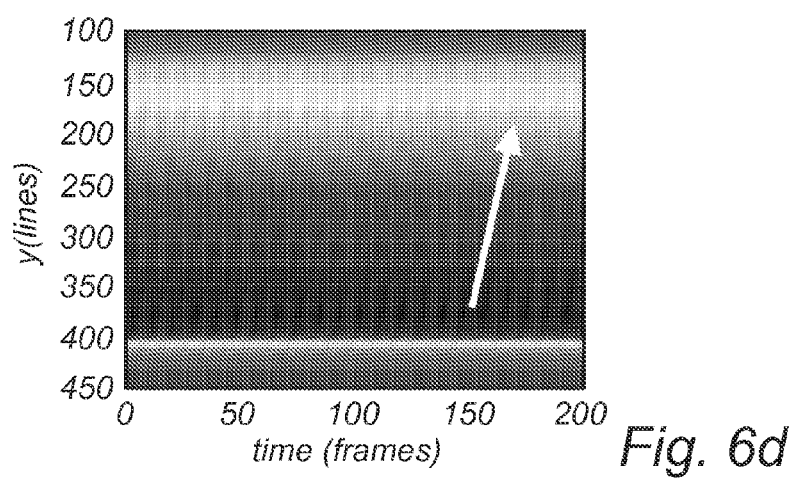
Fig. 6d

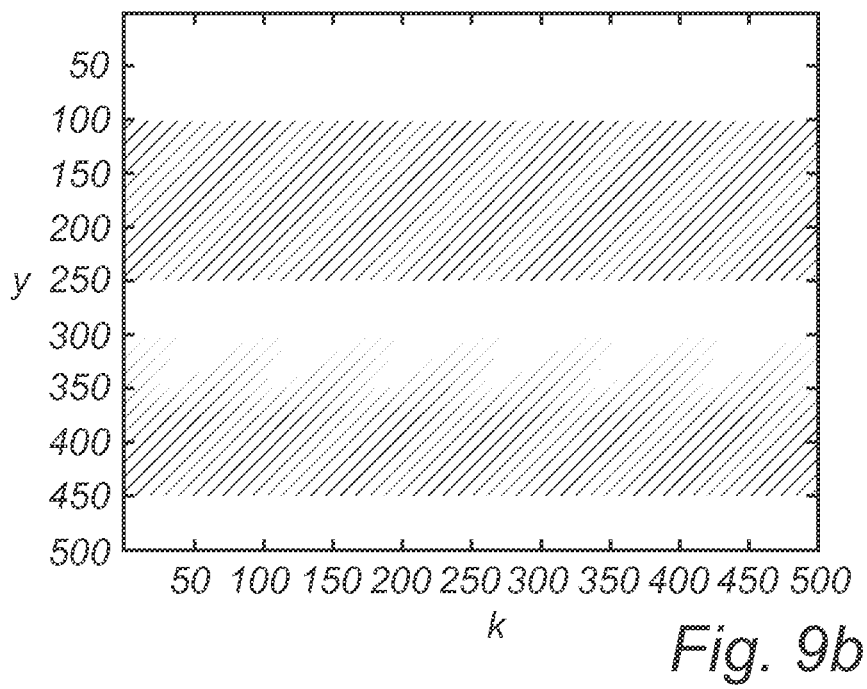
Fig. 9b
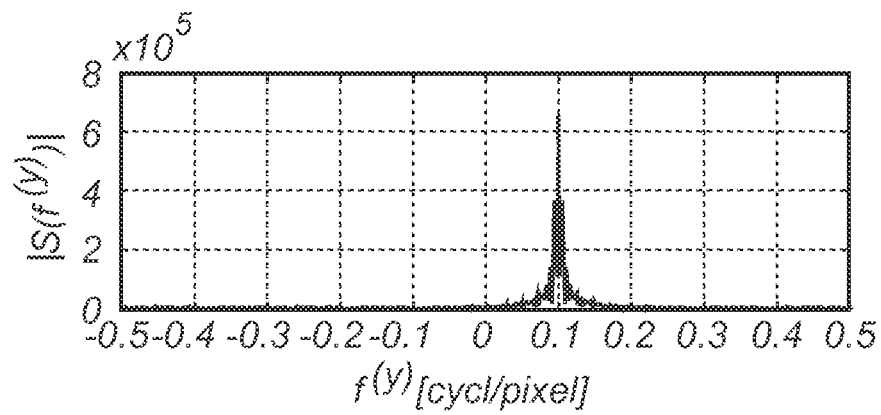
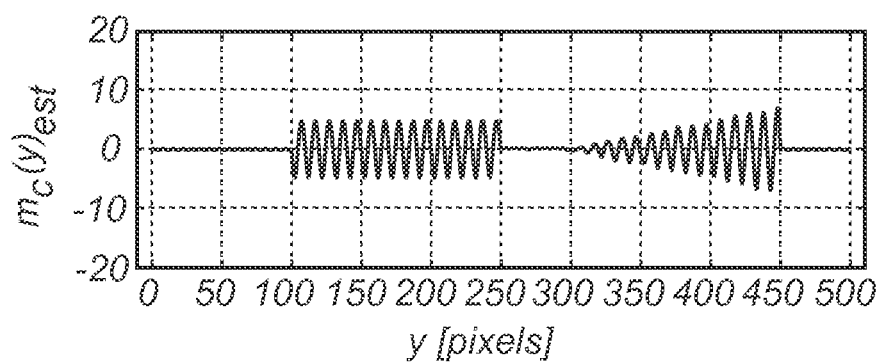
Fig. 9c

LIGHT DETECTION SYSTEM AND METHOD

CROSS-REFERENCE TO PRIOR APPLICATIONS

This application is the U.S. National Phase application under 35U.S.C. §371 of International Application No. PCT/IB2013/058210, filed on Sep. 2, 2013, which claims the benefit of U.S. Provisional Patent Application No. 61/698,761, filed on Sep. 10, 2012. These applications are hereby incorporated by reference herein.

FIELD OF THE INVENTION

The present invention relates generally to the field of illumination, Coded Light illumination systems, and more particularly to a system and method for detecting modulated light in the light output of such illumination systems.

BACKGROUND OF THE INVENTION

Coded Light (CL) is visible light that carries embedded information which is encoded in a form such that the presence of the additional information is imperceptible by the human visual system. Generally, this means that the encoding is based on the use of high-frequent modulations of the light intensity. The encoded information can be anything, from a lamp-specific identifier to an HD-TV signal. The disclosed invention is primarily focused, but not limited to, the use of CL for the identification of different light sources, as well as the identification and quantification of their separate light contributions, or footprints, in the illuminated scene. The detection of lamp-specific identifiers facilitates localization during commissioning of large lighting systems, but also enables localized light control of the detected lamps. Additionally, the lamp specific identifiers can form a basis for location-based services such as indoor navigation, or for the localized transmission of maintenance information.

As CL light involves high-frequency light modulations, it is commonly detected using photodiodes. These, however, only provide point measurements, which is cumbersome in the presence of multiple Coded Light sources and does not provide information about the spatial footprint, i.e. the geometric intensity distribution and spatial localization of light contribution from each individual light source in a scene.

It has been previously demonstrated that Coded Light can also be detected using conventional global shutter cameras by employing exposure times that are sufficiently short to detect a single code bit in every frame. By accurately tuning frame rate and code characteristics, the entire code is then read sequentially over multiple frames. This approach, however, results in very slow read-out capacity and suffers from low light sensitivity.

SUMMARY OF THE INVENTION

It is an object of the present invention to overcome the above mentioned problems, and to provide an improved light detection system and a method capable of detecting CL embedded into a light output of light sources in a manner that allows detection of the embedded data (e.g. unique identifiers) sent by the different light sources being present in a 2D scene.

This object is achieved by a method for detecting modulated light based on a set of images acquired by means of a rolling shutter camera as defined in the appended independent claim 1. Preferred embodiments are set forth in the dependent claims and in the following description and drawings.

Thus, in accordance with the present inventive concept, there is provided a method for detecting modulated light. The method comprises receiving a set of images acquired by means of a rolling shutter camera having image acquisition settings comprising a frame rate, $f_{frame}$, and a line rate, $f_{line}$, identifying in consecutive frames of the images a pattern governed by the ratio between a modulation frequency, $f_c$, of a modulated light source and the line rate, $f_{line}$, and between consecutive frames a spatial shift of the pattern governed by the ratio between the light modulation frequency $f_c$, and the frame rate, $f_{frame}$, and providing based on the pattern and spatial shift thereof, an estimate of the modulated light amplitude from the light source. Rolling shutter image acquisition, which is a technology commonly used in low-cost image sensors, such as the ones integrated in most smart phones, is thus advantageously used to detect Coded Light. As rolling shutter acquisition converts the temporal modulations of Coded Light into vertical (spatial) modulations on the recorded images, it provides efficient sampling of the light using the relatively short time interval between consecutive line readouts of the rolling-shutter image sensor. Fast and light-efficient code detection is then feasible by analyzing the vertical signature of the observed patterns.

It should be appreciated that the light sources use the generation and/or variation of different modulation frequencies as a means to embed data in the light. When the different modulation frequencies are chosen from a discrete set of frequency values, such modulation scheme can be considered as a form of frequency division multiplexing (FDM). In the most elementary case, the FDM scheme can be such that each luminaire is assigned a unique frequency from a predetermined set; in this case the data can be used as a lamp-specific identifier. In another case each luminaire is changing its modulation frequency sequentially in which a different order of modulation frequencies encodes different data symbols, which is known as frequency shift keying (FSK). In the most general use of FDM, each luminaire is modulating the light using multiple frequencies simultaneously, and sequentially changing one or more frequencies to encode a sequence of data symbols.

Advantageously, the proposed method provides increased detection robustness against the presence of background structure, improved data detection (e.g. detection of the unique identifier) in case of a small light source footprint, and improved detection of the spatial footprint of the light source itself. The temporal light modulation of the light from each Coded Light source and the vertical spatial distribution of temporally shifted line instances cause a corresponding spatial vertical pattern in the acquired foot print images of that light source, having certain characteristics that characterize that particular pattern. These characteristics are according to the present invention advantageously utilized in a spatiotemporal analysis to separate the light modulation pattern of a light source from anything in the image that is not related to the Coded Light source, and can further be utilized to allow easy detection of data embedded in the light by the multiple Coded Light sources in the field of view of the image sensor. For example it can be used to detect the unique identifier sent by each lamp.

According to an embodiment of the method, the image acquisition settings and the modulation frequency $f_c$ of the modulated light source are selected to provide a detectable spatial shift of the pattern. The spatial shift is seen as an apparent pattern motion in temporally separated images. The relation between the light source modulation frequency and the frame rate determines the velocity and direction of the apparent pattern motion. Providing specific image acquiring settings may include selecting or determining for instance the frame rate and/or the line rate of the camera. Typically, the line rate and frame rate are used as given in a specific camera and the modulation frequencies of the light sources are selected for maximum detectability.

In industrial cameras, the line rate of a camera can be adjusted, although in most other implementations it is fixed. However, it then still takes different values for different video formats, e.g. different frame sizes and differences in sensor-pixel clustering (so-called pixel binning). Further, the frame rate in commercially available cameras is set to be constant, but is very often allowed to vary (e.g. going down in low light conditions to allow for longer exposure times). Although the concept of providing a predetermined detectable spatial shift is most easily understood under constant frame rate, in practice the frame intervals can be selected arbitrary as long as they are known to the detection algorithm used in the spatiotemporal analysis.

For a given frame rate $f_{frame}$, the choice of the light source modulation frequencies is preferably restricted to particular zones in the domain of apparent spatial and temporal frequencies, which are selected avoiding a low-frequency zone of humanly perceptible frequencies, here chosen to be $f_c$<200 Hz, avoiding zones near multiples of $f_{frame}$ where there is little or no pattern motion, and avoiding zones near repetitions of the Nyquist frequency due to sampling with $f_{frame}$, where there is absence of pattern motion but only a 180° phase change each alternate frame. The avoided zones are illustrated in FIG. 12. When not taking into account attenuation due to the exposure time of the rolling shutter camera, any modulation frequency that is not in the avoided areas may be considered to be detectable. By allocating of light source modulation frequencies such that their apparent spatial and temporal frequencies fall in these detectable zones, separation of light source signals from their background is possible. When a plurality of light sources are to be detected, each of the different light sources modulation frequencies are preferably arranged to be sufficiently separated from each other within the detectable zone.

According to an embodiment of the invention, the selection of image acquiring settings and modulation frequencies is performed by the defining of spatiotemporal frequency channels in the domain of apparent spatial and temporal frequencies for a selection of modulation frequencies such that they are centered around each of the associated apparent spatial and temporal frequencies. In practice, the frequency boundaries of a channel are associated with a desired level of signal attenuation, e.g. to a value of −3 dB of the passband transmission. A possible topology of frequency channels is illustrated in FIG. 14.

According to an embodiment of the method, the step of identifying further comprises: identifying a plurality of the patterns, each corresponding to a respective modulated light source, and comparing identified patterns and/or identified shifts of patterns to distinguish between patterns corresponding to separate modulated light sources, which is advantageous.

According to an embodiment of the method, the modulation frequency, $f_c$, of a respective light source is a fixed unique frequency, is selected from a set of candidate frequencies, comprises a set of candidate frequencies applied simultaneously, or is selected from a set of candidate frequencies according to a given sequence. Selecting a fixed unique modulation frequency provides a simple way of distinguishing a light source from other light sources. The selection can be made amongst a set of candidates which are adapted to fit common image acquiring settings of commercially available rolling shutter cameras or be selected in a sequence. Simultaneous transmission of multiple frequencies instead of one single frequency is advantageous for instance as a possible third stage of frequency allocation is related to the momentary value of the exposure time, $T_{exp}$. In some implementations, the exposure time of the rolling shutter camera cannot be selected. However, its value is known. In order to avoid signal cancellation due to zeros in the frequency characteristics associated with the exposure time, the modulation frequencies of a light source can systematically choose a smaller subset of light source modulation frequencies from a total set of allocated frequencies. For example, the 18 'best' frequencies out of a total of 24 may be chosen. For different values of the exposure time, this subset of 18 frequencies tends to be different.

According to an embodiment of the invention, a fixed set of frequencies is used for all light sources and therefore in all acquired spatial patterns, but the unique characteristic of the each spatial pattern is the unique order at which the frequencies are repeated. This modulation method is a form of frequency shift keying (FSK).

According to an embodiment of the method, the modulation frequency, $f_c$ , is selected to provide optimal spatiotemporal separation of the recorded image pixel intensities from a static background, and/or to provide optimal spatiotemporal separation of the recorded image pixel intensities or image processing derivates thereof, for multiple light sources with respect to each other.

According to an embodiment of the method, the step of providing an estimate of the modulated light further comprises for at least two consecutive frames: subdividing each image in a predetermined fashion into one or more spatial regions, for each one of the spatial regions, integrating intensity values of predetermined pixels in the spatial region in a horizontal direction to create a region-specific and frame-specific value array, and creating a region-specific value-array stack by stacking frame-specific and region-specific value arrays of the spatial region, such that the region-specific value-array stack provides a spatiotemporal representation of the true temporal modulation of the modulated light from a light source which is imaged within the region. The spatiotemporal analysis is based on the spatial and temporal characteristics of an intensity pattern in the region or regions, which is advantageous.

Integration of pixel values in the horizontal direction provides a reduced spatial resolution in the horizontal direction, which is advantageous. Due to each acquired image being composed by a set of vertically spatially distributed temporally shifted line instances all pixels along the same line in an acquired image belong to the same time instant. Integration over multiple adjacent pixels can advantageously be used to improve the signal-to-noise ratio of the value-array (the one-dimensional signal that represents the average pixel value). A second advantage is that the processing of a smaller set of region-specific value-array stacks is more computationally efficient than the processing each column of the whole image separately.

According to an embodiment of the method, when a current exposure time $T_{exp}$ of the image acquiring device is known, the step of providing an estimate of the modulated light further comprising: performing a correction for frequency dependent attenuation due to time integration during exposure in the acquired images, which is advantageous.

According to an embodiment of the method, when used in a light detection system comprising a rolling shutter camera for acquiring the images of at least one modulated light source. The image acquiring settings are provided by performing a calibration of the rolling shutter camera, or are retrieved from an internal or external database of the rolling shutter camera.

According to an embodiment of the method, the step of selecting modulation frequencies and image acquiring settings further comprises: exchanging information concerning at least one current image acquiring setting and/or at least one current modulation frequency between the rolling shutter camera and the at least one light source, or a control system of the light source. The selection is performed based on at least one current image acquiring setting or current modulation frequency.

According to an aspect of the invention, there is provided a light detection device comprising a rolling shutter camera being arranged for acquiring a set of images of a scene being illuminated by an illumination system, the illumination system comprising at least a first modulated light source, and processing means arranged for performing a method according to any preceding claim.

As used herein, the term "pixel" refers to a unit of the image data corresponding to a particular point within a scene. Image data comprises intensities (or derivatives thereof) of the total light output of an illumination system, which may contain a plurality of light sources, at different points within the scene. Arranging image data in rows and columns of pixels is one way of representing a three-dimensional (3D) scene in a 2D image. As used herein the term "rolling shutter camera" refers to any imaging device or sensor that utilizes rolling shutter image acquisition.

These and other aspects, features, and advantages of the invention will be apparent from and elucidated with reference to the embodiments described hereinafter. It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

FIG. 1a) and b) are schematic illustrations showing consecutive frames of images acquired with a rolling shutter camera of a Coded Light source;

FIG. 2a) and b) are schematic illustrations showing consecutive frames of images acquired with a rolling shutter camera of two Coded Light sources;

FIG. 5 a) to c) schematically illustrate signal processing steps according to an embodiment of the method of the present inventive concept;

FIG. 6a) to d) schematically illustrate signal processing steps according to an embodiment of the method of the present inventive concept;

DETAILED DESCRIPTION

Figure 3:
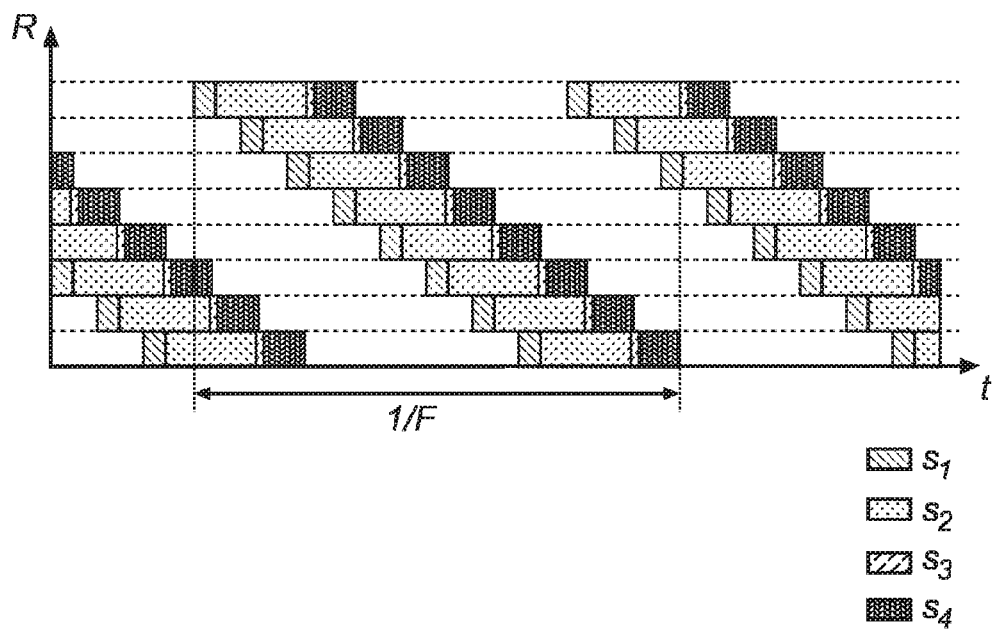
FIG. 3 is a schematic time diagram for a typical rolling-shutter camera during video streaming mode.

The present invention will now be described more fully hereinafter with reference to the accompanying drawings. The below embodiments are provided by way of example so that this disclosure will be thorough and complete, and will fully convey the scope of the invention to those skilled in the art. Like numbers refer to like elements throughout.

In the following, we consider a scenario in which Coded Light is used to transmit light source identifiers by modulating each light source with a characteristic frequency selected from a predetermined set of candidate frequencies. The scope of the invention, however, is by no means limited to this scenario. It should be appreciated that the detection of a sequence of different modulation frequencies per lamp, but also the simultaneous detection of multiple modulation frequencies per lamp can respectively be considered as temporally separated combinations or as linear combination of detection results from single-frequency modulations. Therefore we confine the detailed description of the detection to the single-frequency-per-lamp scenario without any loss of general applicability to the multiple-frequency-per-lamp scenarios described above. Therefore, for convenience we choose to use the same index c to both denote a particular modulation frequency $f_c$ and the associated frequency channel, as well as the associated lamp carrying this modulation frequency.

Further, we assume that the acquired image sequences have been converted to the linear light domain, i.e. the influence of the camera's non-linear intensity response (gamma transform) is assumed to have been corrected for. Finally, we assume that the modulation index is the same for every Coded Light source, such that the modulation amplitude is linearly proportional to the temporal average of the light intensity.

FIGS. 1a) and 1b), illustrate two consecutive frames of a set of images acquired by means of a rolling shutter camera of a structure 100. The structure 100, which here is a room, is illuminated by a light source 110, which is modulated with a modulation frequency $f_c$. The illumination from the light source 110 on the wall 101 is here shown as a footprint 111. When acquiring images of Coded Light sources, camera parameters, or image acquiring settings, like the line rate $f_{line}$, and the frame rate $f_{frame}$ play a key role in translating a physical modulation frequency, here the modulation frequency $f_c$, into an apparent spatial and temporal frequency which will be explained below. Although the value of the line rate $f_{line}$ and the frame rate $f_{frame}$ can generally be adjusted for most image sensors, they are often fixed when the image sensor is embedded in a product, such as a rolling shutter camera in a webcam or a smartphone. The rolling shutter acquisition converts the temporal modulation of the Coded Light into a spatial intensity modulation along the vertical axis in the acquired image, which appears as a striped intensity pattern in areas of the image where Coded Light is present. In FIGS. 1a) and 1b), these striped areas are illustrated within the foot print 111. The spatial intensity modulation, which is vertically distributed in each frame, has a pattern pitch P [pixels], corresponding to an apparent spatial frequency $f_c^{(y)}$ in the intensity pattern, which is dictated by the ratio between the modulation frequency $f_c$ and line rate, $f_{line}$, of the rolling shutter camera/sensor. A given line rate and frame rate fix the relationship between a particular light source modulation frequency $f_c$ and, respectively, an apparent spatial frequency:

$$f_c^{(y)} = \frac{f_c}{f_{line}} [cycl/\text{line}], \quad (1)$$

as well as an apparent temporal frequency:

$$f_c^{(t)} = \left[\left(\frac{f_c}{f_{frame}} + \frac{1}{2}\right) \mod 1\right] - \frac{1}{2} [cycl/\text{frame}], \quad (2)$$

where the mod operator is the modulo operator. The modulo operator x mod y is the remainder of the division x/y. It can be calculated using the 'floor' operator, using the expression:

$$x \mod y = x - y\left\lfloor\frac{x}{y}\right\rfloor.$$

Thus, the frame rate, $f_{frame}$, of the rolling shutter camera, in turn, affects the phase of the spatial intensity pattern of the footprint 111, such that in the recording feature in the consecutive frame in FIG. 1b) of light source 110, the same intensity pattern of footprint 111, captured at $t=t_1$, is shifted a distance $\Delta y$ along the vertical axis at the second time instance $t=t_2$. See FIG. 1b). Note that the vertical spatial pattern shifts in consecutive acquired images, while the footprint itself stays at the same spatial location.

In FIGS. 2a) and 2b), two consecutive frames of a set of images taken at two time instances $t=t_1$ and $t=t_2$, of a wall 101, which is illuminated by an illumination system comprising two Coded Light sources, 110, and 120, are shown. The images were acquired by a rolling-shutter camera with a known frame rate, $f_{frame}$, and a known line rate, $f_{line}$. Footprints 111, 211 on the wall 101 show the spatial distribution of the respective contribution to the total illumination of the wall 101 by the respective light source 110,120. Typically, the total illumination further includes ambient lighting, i.e. background lighting. Each light source 110, 120 is coded such that its light output comprises an individual identifier code ID#1, and ID#2, which is typically an embedded code emitted as a temporal sequence of modulations in the characteristics of the light emitted from the individual light source having a respective modulation frequency $f_c$. Here the modulation frequencies $f_1$, $f_2$ of the respective light source 110,120 are selected such that the apparent movement of the intensity pattern of each foot print 111, 211 moves in opposite directions in the consecutive frames. The intensity patterns, and their respective phase shifts between consecutive frames, i.e. their apparent movement of the intensity pattern, are characteristic to the individual light sources which are thus separable and detectable in the image because the relation between the frame rate, the Coded Light modulation frequency and the phase shift is known.

According to an embodiment of the method, the sequence of images is acquired at irregular temporal intervals. Provided that the time difference to the previous frame is known, the apparent temporal phase difference is calculated such that any of the recursive phase-corrected methods continues to provide a correct calculation of the frequency-specific temporal phase correction.

An acquired image of a scene is captured as the rolling-shutter capture runs in a vertical direction. Therefore, the light modulation is also distributed in the vertical direction of the video frame. As a consequence, the vertical dimension of the light phenomenon in the video frame limits the temporal window with which the modulation can be observed. As the Coded Light is illuminating the scene, the light modulation appears both in images of the light source itself as well as in images of the illuminated scene, in captured light footprints.

The rolling-shutter capture of the sensor provides a mechanism to distinguish temporal light variations far beyond the frame rate of the camera. Where the video frame rate is typically within a range of 25 to 60 Hz, the line readout frequency, $f_{line}$, is typically higher than approximately 10,000 Hz. The rolling shutter acquisition represents a form of spatiotemporal sampling in which the temporal dimension is (at least partially) sampled along the vertical dimension. As such, there exists a relation between the time t and the vertical (line) position y, $$t(y, k) = \frac{y}{f_{line}} + \frac{k}{f_{frame}}, \quad (3)$$

where $f_{frame}$ denotes the frame rate, y=0,1,2, . . . is a line index, and k=0,1,2, . . . is a frame index.

FIG. 3 provides a graphical representation of this spatiotemporal sampling procedure. A time diagram for a typical global shutter system during video streaming mode is shown. In a rolling-shutter system, during a frame each row of pixels R is first reset ($s_1$), and subsequently exposed ($s_2$) during an exposure time $T_{exp}$, followed by a charge transfer (where the row is moved to a darkened area of the sensor) ($s_3$), and finally read ($s_4$) during a readout time $T_{read}$. The rows are reset and exposed, and read out one row after another. Rolling-shutter sensors offer a higher pixel density compared to a global shutter CMOS-sensors. The sequential exposure of subsequent lines results in a time delay between exposures of adjacent rows. This causes captured images of moving objects to be distorted.

To continue, consider now a single temporally Coded Light intensity signal $I_c(t)$ [W/sr] from a light source with index number c, consisting of a DC component of amplitude $I_{DC,c}$ and an AC component of amplitude $I_{AC,c}$ modulated at the modulation frequency $f_c$, selected out of a predefined set of known frequencies; in complex notation, $$I_c(t) = I_{DC,c} + I_{AC,c} e^{-i2\pi f_c t} [W/sr]. \quad (4)$$

This light source causes an illumination of objects that, once captured with a camera, results in an image sequence that can be represented by a spatiotemporal signal s(x, y, k). When captured with a rolling shutter camera, a static scene illuminated by $N_c$ Coded Light sources, each modulated at a single unique frequency, can then be described as $$s(x, y, k) = b_{amb}(x, y) + n(x, y, k) + \sum_{c=1}^{N_c} \left[ b_c(x, y) + a_c(x, y) e^{-i2\pi \left( \frac{f_c}{f_{line}} y + \frac{f_c}{f_{frame}} k \right)} \right] \quad (5)$$

$$= b(x, y) + n(x, y, k) + \sum_{c=1}^{N_c} \left[ a_c(x, y) e^{-i2\pi \left( f_c^{(y)} y + f_c^{(t)} k \right)} \right].$$

In the above, $b_{amb}(x,y)$ and $n(x, y, k)$ represent the signal generated by reflections of (non-coded) static ambient illumination off the scene and noise, respectively. The coded-light source-specific DC contributions $b_c(x, y)$, essentially the projections of each light footprint in the image plane, are not relevant in the disclosed detection algorithm. (The shape and intensity of light footprints and, overall ambient light distribution might affect clipping of certain image region depending on the exposure settings and dynamic range of the selected sensor.) The newly introduced compound background signal b(x,y) therefore holds the sum of all light source specific and 'independent' DC components, $$b(x, y) = b_{amb}(x, y) + \sum_{c=1}^{N_c} b_c(x, y). \quad (6)$$

Please note that the modulation amplitudes $a_c(x, y)$ of the light source as well as the compound background component b(x,y) generally vary over space, as these depend on the geometry and reflective properties of the scene.

Equation (5) shows that rolling shutter acquisition maps physical modulation frequencies $f_c$ [Hz] to apparent spatial frequencies $f_c^{(y)}$ [cycl/line] through division by the line frequency $f_{line}$, as described above in equation (1). Similarly, the same physical frequency $f_c$ maps to an apparent temporal frequency $f_c^{(t)}$ [cycl/frame], see equation (2), when frames are captured at a fixed interval. In practice, the frame rate $f_{frame}$ is much lower than the frequencies $f_c$ that modulate the light. As a consequence, the apparent temporal frequency $f_c^{(t)}$ is always lower than half the frame rate. Consequently, the apparent temporal frequency 'wraps around' between the limits $$-\frac{1}{2} < f_c^{(t)} < \frac{1}{2}$$

for increasing physical modulation frequency $f_c$. The relation between the apparent spatiotemporal frequencies and the physical modulation frequency is indicated by the slanted continuous line in FIG. 12, which depicts a section of the domain of apparent spatial and temporal frequencies (only the domain for positive apparent spatial frequencies, $f^{(y)}>0$).

Figure 4:
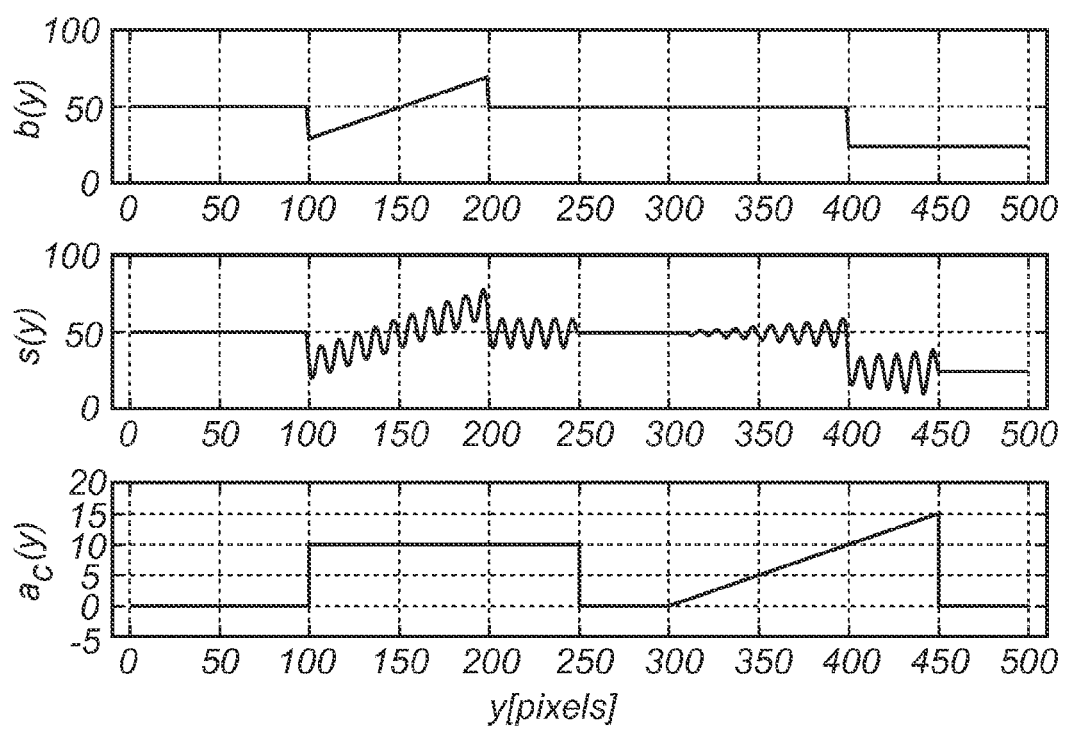
FIG. 4 shows example signals for illustrating an embodiment of a method of the present inventive concept.

FIG. 4 illustrates a synthetic example representing the intensity signal s in one single column of an acquired image containing the contribution of one single Coded Light source with integer index c (middle). On purpose, the spatial variation of the modulation amplitude $a_c(x, y)$ has been chosen to be significantly different from the background signal b (x, y). FIG. 4 thus shows the example column signal s(y), with an assumed background signal b (y), being for instance some ambient lighting in the room of which the images are acquired, and the spatial profile of the modulation amplitude $a_c(y)$ (bottom). No noise is added to the column signal in FIG. 4. FIG. 5*a*) shows a signal s(y), which is the same signal as in FIG. 4. In FIG. 5*b*) the signal s(y) is the same signal as in FIG. 5*a*) with additional white Gaussian noise, which thus better represent a real recorded signal. FIG. 5*c*) shows a temporal time stack s(y, k) composed of the same column as in FIG. 5*b*) for 500 frames. In the diagram frame number, k, is arranged on the horizontal axis, and row number, y, on the vertical axis. In this example, the apparent temporal frequency is $f_c^{(t)}=0.2$ [cycl/frame]. The combination of the apparent spatial and temporal frequencies causes a crawling motion pattern that in this example appears to be moving upward with time.

FIG. 6*a*) illustrates the same illumination system as previously described with reference to FIG. 2*a*). The light sources 110, and 120, are here two Philips LivingColors light sources, each illuminating the background wall 101 with a different color, and each being modulated at different characteristic temporal frequencies. The input for the analysis to provide an estimate of the modulated light from the light sources is here a 500-frame video sequence of the scene, the room 100. Further a respective region-of-interest (ROI), $ROI_1$ and $ROI_2$ in FIG. 6*a*) and FIG. 6*b*), respectively, is selected in the set of images. FIG. 6*c*) shows the result of a temporal time stack, as explained below, obtained for $ROI_1$, which is dominated by the footprint 111 of the left light source 111, whereas FIG. 6*d*) demonstrates the result a corresponding temporal time stack obtained for $ROI_2$, which is dominated by the footprint 211 of the right light source 120.

Within each video frame, the signal within the designated ROI is isolated and integrated along the horizontal direction. Because rolling shutter acquisition converts temporal modulations into vertical spatial patterns, the horizontal spatial dimension holds little information and is used merely to improve the signal strength. FIG. 6*c*) and FIG. 6*d*) show the result of this procedure applied to all 500 frames of the sequence. In these Figures, each row shows the results of the horizontal integration of the ROI of a single frame, again revealing the apparent spatial and temporal variations that together form apparent motion patterns annotated by white arrows in the bottom frames of FIG. 6*c*) and FIG. 6*d*). Because the different light sources in this scene are modulated at unique temporal frequencies $f_c$, they exhibit both differences in the spatial and motion characteristics of the recorded patterns. Differences in physical modulation frequencies between the light sources result in characteristic spatiotemporal patterns that form the basis for light source identification and footprint estimation algorithms according to the method. Note that these differences can be observed not only in the speed of the motion, but also in its direction. In this example, the pattern of the left light source propagates from top to bottom, whereas the pattern generated by the right light source moves from bottom to top.

Note that anywhere in the embodiments herein, where there is referred to an 'image' or 'image sequence', the input may also be confined to a spatial region of interest (ROI) instead of the complete image frame.

The present invention is based on an insight that combined spatiotemporal analysis of the signal s (using both factors of the exponential term in equation (6)) results in more accurate and robust code detection than simple time averaging. Scene background and Coded Light signals can be easily discriminated on the basis of motion characteristics, as the background can be assumed to be static (for a static camera position), whereas the Coded Light target is known to move across the scene at predefined, known velocities, as demonstrated by equation (6), FIG. 5 and FIG. 6.

The challenge of identifying individual Coded Light sources effectively comes down to identifying which frequencies $f_c$ can be found in an image sequence $s(x, y, k)$. For some applications, such as scene setting and atmosphere creation, it can be advantageous to also estimate the spatial footprint for every light source c individually.

Modulation frequencies are preferably selected according to different criteria:

Avoiding frequencies that are a multiple of the frame rate, which cause a static pattern.

Avoiding frequencies that are a multiple-and-a-half of the frame rate; they appear as an oscillating pattern that alternates phase by π (i.e. 180°) each alternate frame.

Any other light source frequency then the two examples above (not considering effects of the exposure time of the camera as explained below), causes a pattern to crawl upward or downward with a constant apparent velocity: this is desired as it allows separation from the background.

Figure 14:
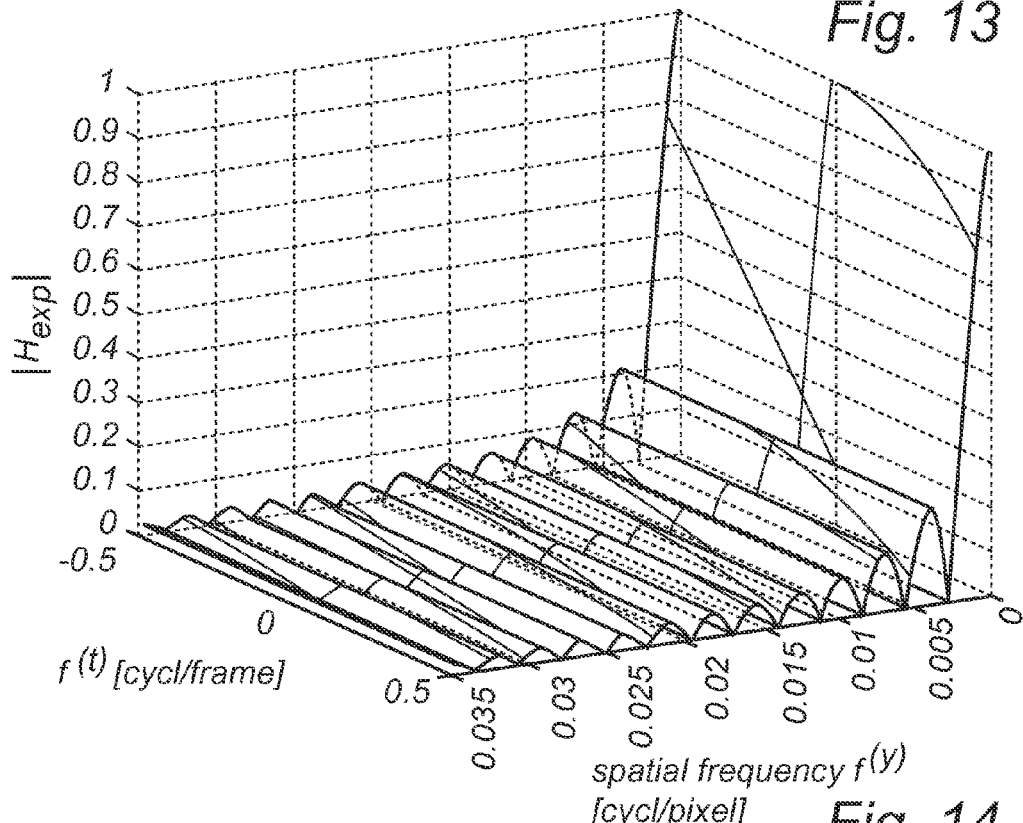
FIG. 14 schematically illustrates the definition of frequency channels in the domain of apparent spatiotemporal frequencies.
Figure 15:
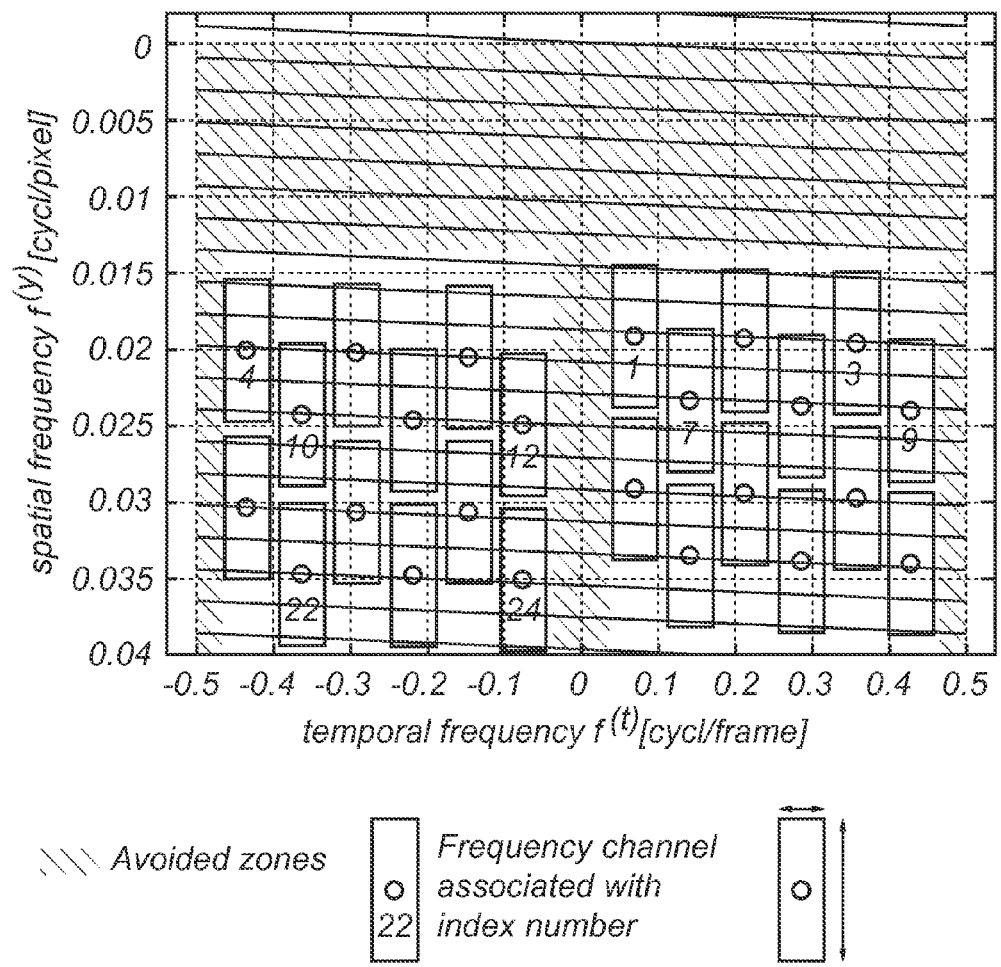
FIG. 15 schematically illustrates frequency channels with index number in the domain of apparent spatial and temporal frequencies.

Spatiotemporal frequency channels sub-bands are selective to a particular part in the spatiotemporal frequency domain. The parameters of both can be tuned. The channels should have minimal overlap for optimal selectivity. An example of such channel topology is depicted in FIG. 14. FIG. 14 depicts the domain of apparent spatial and temporal frequencies showing a possible allocation of 24 spatiotemporal frequency channels of which the center (indicated by the blue circles) is always located on the trace of apparent spatial and apparent temporal frequencies $f^{(y)}$ and $f^{(t)}$ respectively as a function the physical modulation frequency of the lamp. The apparent spatial and temporal bandwidth of each channel is respectively defined by $\Delta f_c^{(y)}$ and $\Delta f_c^{(t)}$ as indicated by the vertical and horizontal double-pointed arrows respectively.

Further, in practice the camera exposure time needs to be considered. To this time, we have based our analysis on a sinusoidal light modulation. In general, the analysis holds for all modulating waveforms. This means that also higher harmonic components of a single lamp signal can be incorporated in the recovery of the light source-specific light distribution over a column.

For practical reasons, light sources can be modulated by a rectangular wave, such that variation of the duty cycle allows for easy control of the average light intensity while maintaining a fixed modulation amplitude. The amplitude of this, so-called pulse-width modulated light can extend the full dynamic range, such that the lamp is then momentarily off during a percentage of each cycle.

Unfortunately, in many cases, the initial amplitude of the modulation is not retained during image capture. In practice, the exposure time needs to be sufficiently long to avoid acquisition noise. Such long exposure times introduce a band-limiting effect causing a suppression of the original modulation amplitude and even a cancellation of the modulation in the captured image sequence.

The effect of the exposure time is a convolution with a block kernel which causes modulations to be suppressed by a "sinc" function as a function of the frequency, which creates blind spots in the spatiotemporal frequency domain. (The sinc function has various definitions; we use $\text{sinc}(x) = \sin(x)/x$.) These blind spots can be dealt with in several ways, for instance by updated light source frequencies with detectable values, or use of multiple frequencies per light source.

Figure 12:
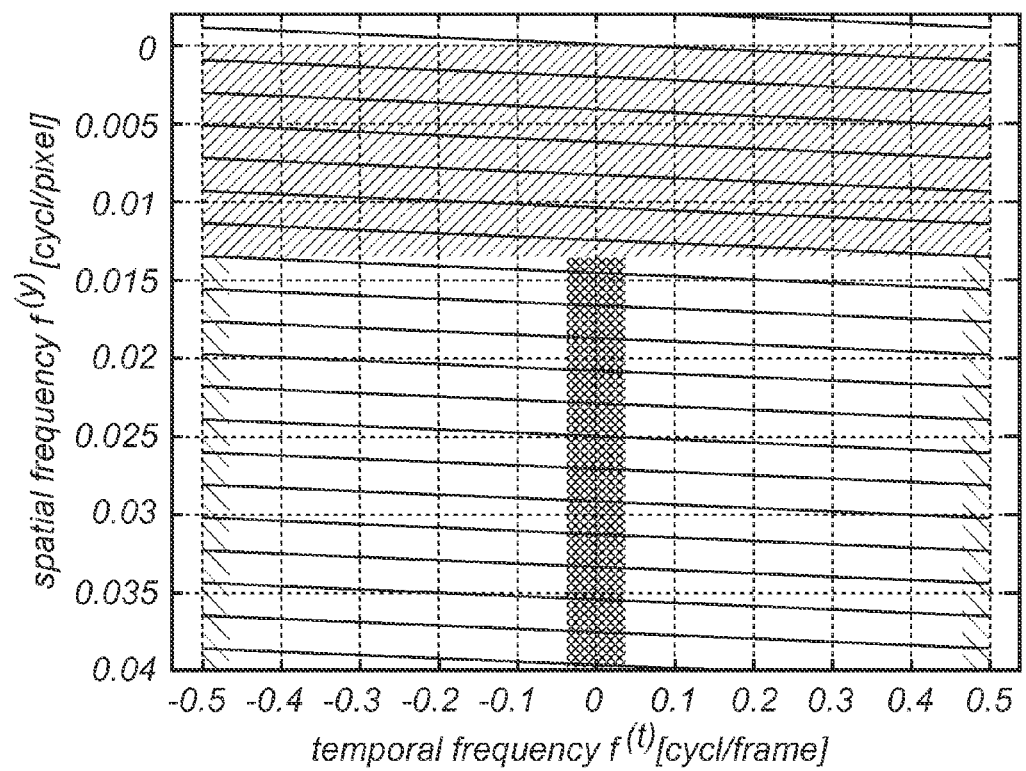
FIG. 12 depicts the domain of apparent spatial and temporal frequencies, the locus of a physical modulation frequency, as well as avoided frequency zones.

FIG. 12 depicts the domain of apparent spatial and apparent temporal frequencies $f^{(y)}$ and $f^{(t)}$ respectively. The trace of physical lamp modulation frequencies is plot as a slanted and warping line (on the basis of $f_{frame}=29.97$ [Hz] and $f_{line}=14386$ [Hz]). In FIG. 12, the upper finely striped area represents an avoided low-frequent zone of humanly perceptible frequencies, here chosen to be $f_c<200$ Hz. The center diamond patterned area represents an avoided zone near multiples of $f_{frame}$ where there is little or no pattern motion. Finally the striped areas at temporal frequencies close to ±0.5, represents avoided zones near repetitions of the Nyquist frequency due to sampling with $f_{frame}$, where there is absence of pattern motion but only a 180° phase change each alternate frame. A modulation frequency that is not in the avoided areas is considered to be detectable.

Figure 13:
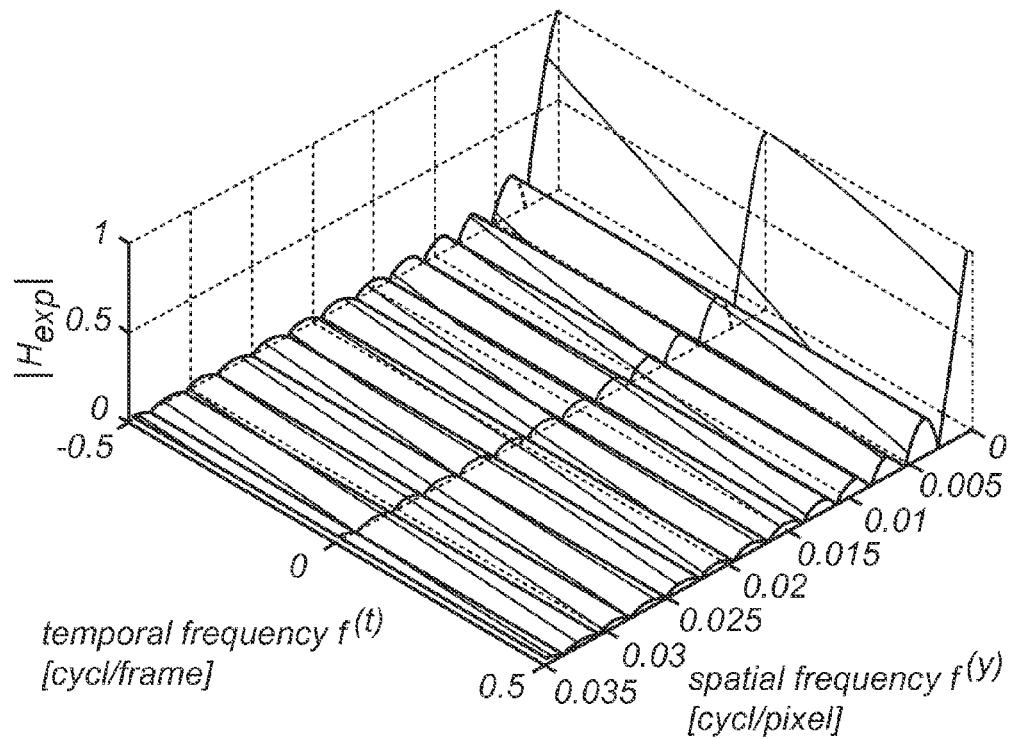
FIG. 13 depicts the domain of apparent spatial and temporal frequencies in 3D, the locus of a physical modulation frequency, as well as the frequency response associated with temporal light integration during camera sensor exposure.

FIG. 13 depicts the magnitude of the exposure-related sinc-shaped frequency response function as a function of the apparent spatial and apparent temporal frequencies $f^{(y)}$ and $f^{(t)}$ respectively. The sinc response forms a different curved plane that is depicted as a semitransparent "landscape" of peaks (i.e. local maxima) and valleys (i.e. zeros), the location of which varies as a function of exposure time. For clarity, a central curve at $f^{(t)}$ indicates the shape of the sinc-response. The locus of apparent frequencies is overlaid as a curve that warps between $f^{(t)}=-0.5$ and $f^{(t)}=0.5$ as it follows its warping path over the sinc-landscape. The zeros and local maxima of the sinc function occupy equidistant lines parallel to the axis for which $f^{(y)}=0$. The zeros of the sinc function indicate frequencies for which detection is not possible.

The embodiments presented herein under are based on prior knowledge of the rolling shutter camera's line- and frame rate as well as the modulation frequencies that are associated with each light source index. Such prior knowledge can come from an internal or online database holding these parameters from a range of popular mobile devices, such as smartphones and tablet computers. In absence of such database, prior knowledge can also be obtained on the basis of an, initial, one-time calibration.

The set of predefined physical frequencies can be chosen in such a manner that the recorded signals are optimally separable from a static background and from each other on the basis of spatiotemporal frequency domain signal analysis. The following embodiments are intended to exploit such spatiotemporal frequency-channel separation.

Figure 7:
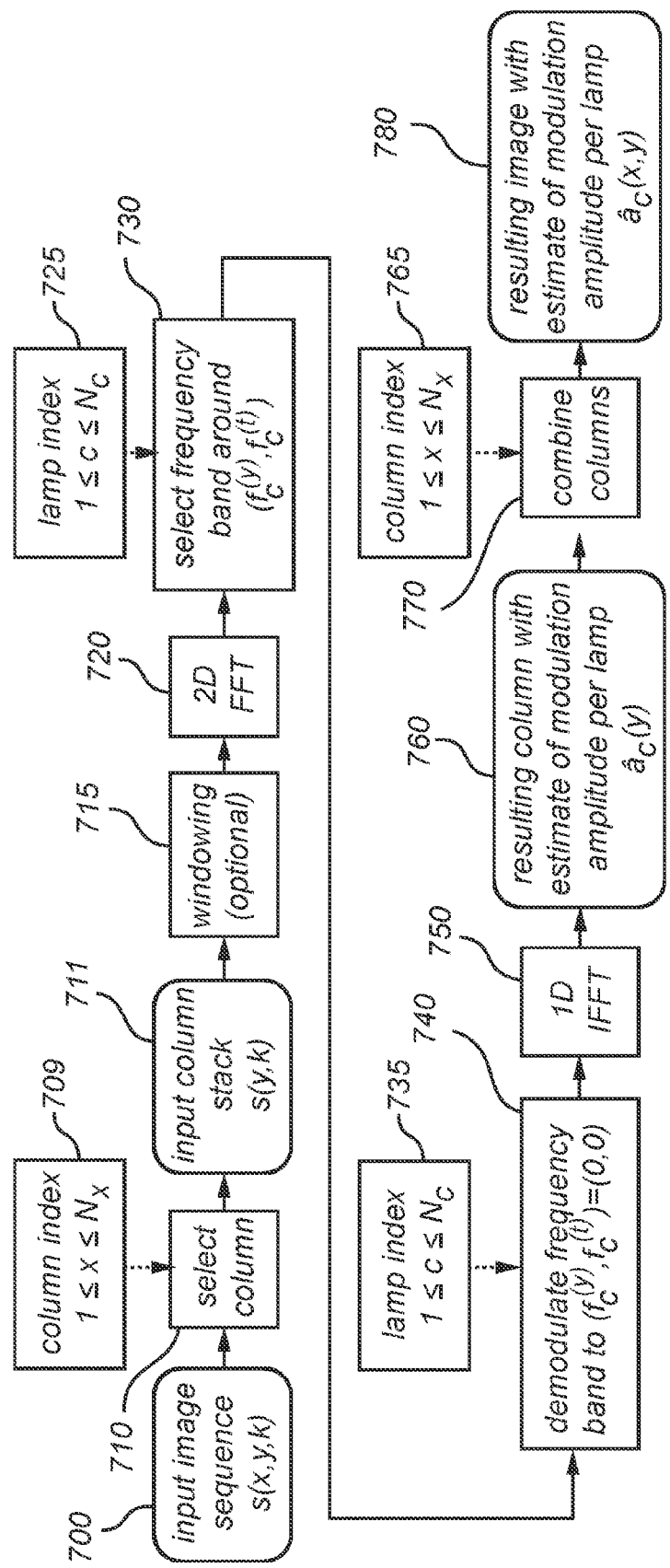
FIG. 7 is a block scheme illustrating an embodiment of a method of the present invention.

According to an embodiment of the present method as illustrated in FIG. 7, the spatiotemporal Coded Light detection provides an estimate $\hat{a}_c(x, y)$ of the spatial distribution of the modulation amplitude for a given frequency-channel index c, given an image sequence $s(x, y, k)$ as input. In FIG. 7, the rounded rectangles represent the signal or result data at different steps. The square rectangles represent a process. This embodiment is based on explicitly using a 2D discrete Fourier transform (DFT) in the form of a 2D FFT per column stack $s(y, k)$.

Figure 8:
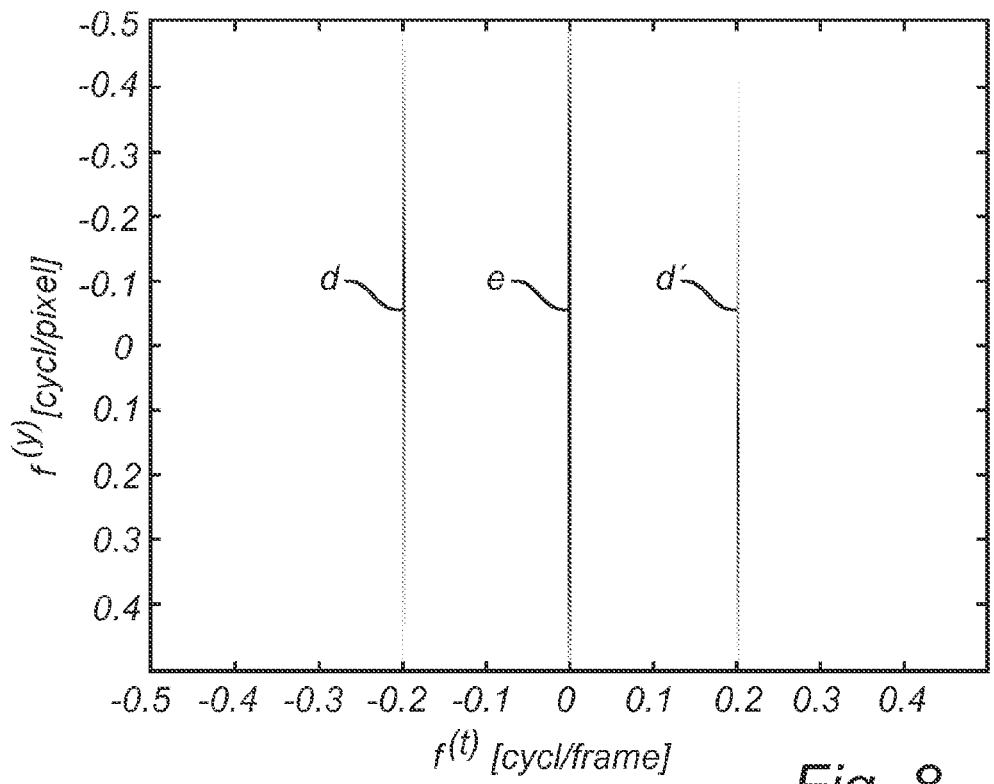
FIG. 8 schematically illustrates a signal processing step according to an embodiment of the method of the present inventive concept.

Since $s(y, k)$ is a 2D signal, the result of the DFT also is a 2D complex-valued matrix $S(f^{(y)}, f^{(t)})$, which has the same dimensions as the input data. Starting at a step 700 an input image sequence $s(x, y, k)$ is provided. At 710 column indexes between 1 to $N_x$ are selected to form an input column stack s(y, k), step 711. An optional step of windowing is performed at step 715. The column stack s(y, k) is then subjected to a two-dimensional discrete Fourier transform in step 720, which is illustrated in an exemplifying example in FIG. 8. Depicted in FIG. 8 is the magnitude $|S(f^{(y)}, f^{(t)})|$ (for visibility, the logarithm of the magnitude is shown), i.e. the DFT of the column stack (s(x, y)) which results in a 2D complex valued matrix. The spatiotemporal 'wave' pattern is found back as isolated distributions (indicated as d, d' in FIG. 8), separated from the central distribution along the $f^{(t)}$-line (indicated as e in FIG. 8), which relates to the background signal (static) while the two conjugate peaks relate to the oscillating signal contributions. The DFT clearly exhibits distinct energy distributions, where the central contribution e relates to the background signal and the two conjugate peaks d, d' relate to the oscillating signal contribution of our light source. Note that, in accordance with the direction of the positive y-axis, also here the positive $f^{(y)}$ axis is pointing down.

Figure 9A:
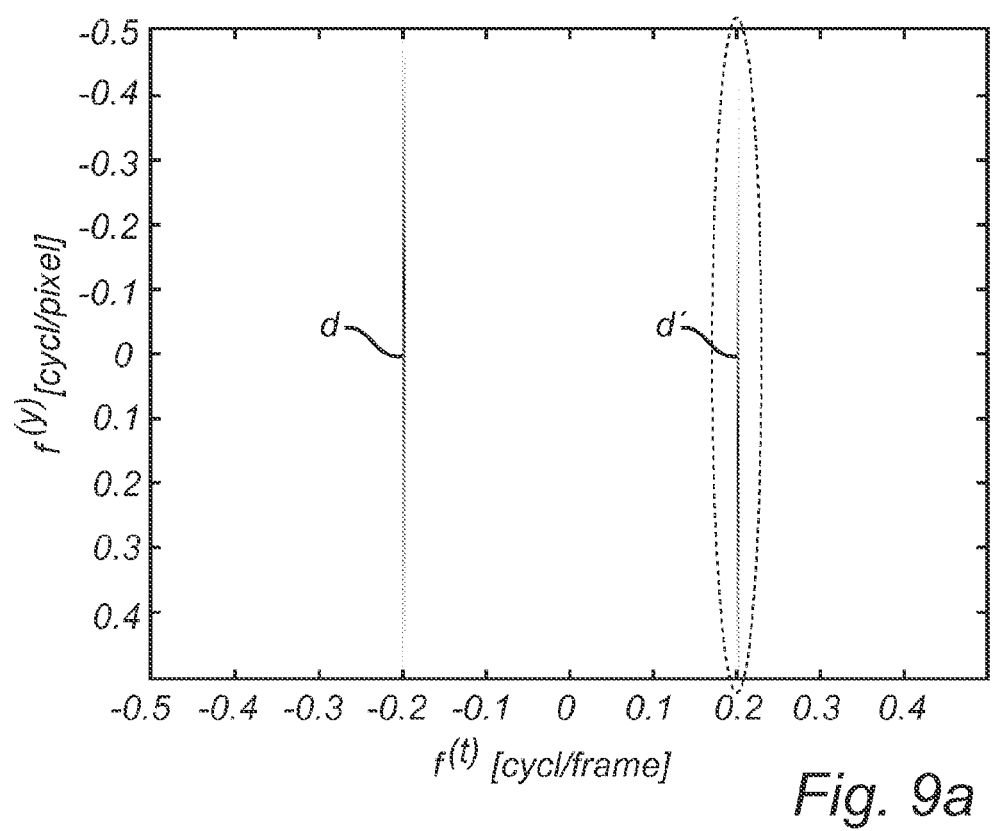
FIG. 9 schematically illustrates signal processing steps according to an embodiment of the method of the present inventive concept.
Figure 9D:
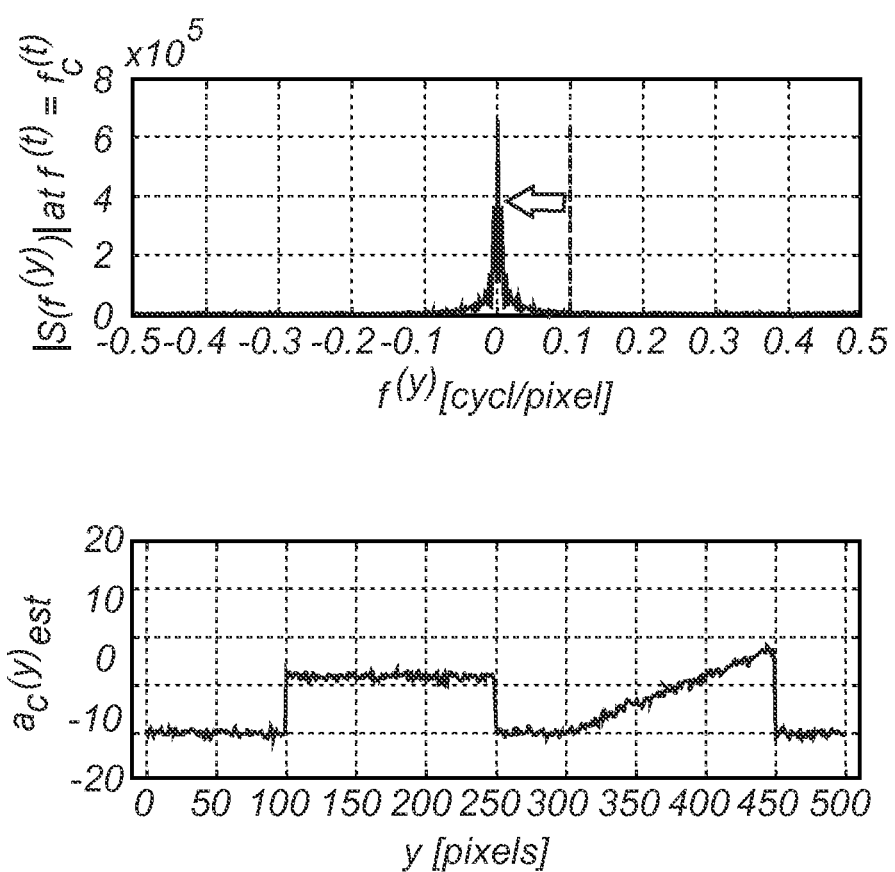

To continue, with reference to FIG. 7, after performing step 720, for each light source c a spatiotemporal frequency band associated with a specific light source c is selected and is subsequently demodulated to perform a frequency band shift to $(f^{(y)}, f^{(t)})=(0,0)$, see FIG. 9. FIG. 9 illustrates in several steps how an amplitude estimate follows from a selected spatiotemporal sub band. FIG. 9*a*), shows $S(f^{(y)}, f^{(t)})$, the Fourier transform of the column slice s (y, k), after suppression of all components except at apparent temporal frequency $f_c^{(t)}$ and $-f_c^{(t)}$. Its inverse Fourier transform, performed at step 750, is shown in FIG. 9*b* and clearly shows the recovery of the oscillating signal component of the modulated light in absence of any background contribution. The inverse Fourier transform results in an estimate of the modulation term in absence of any background signal. FIG. 9*c*) shows a 1D Fourier slice taken out at $f^{(t)}=0.2$ [cycles/frame] and its inverse transform. Finally, at step 760, in FIG. 7, the resulting column with estimate of modulation amplitude per light source is provided, see FIG. 9*d*) which shows the same Fourier slice, as in FIG. 9*c*) but after a cyclical shift to $f^{(y)}=0$, and its inverse transform, providing an approximation of the amplitude profile, $\hat{a}_c(y)$.

In step 770, in FIG. 7, columns from different column indexes are combined which results in an image with an estimate of modulation amplitude per light source $\hat{a}_c(x, y)$.

Since it is the amplitude of the modulated light that we want to recover. When selecting a sub band above, we can exploit the fact that S is conjugate symmetric, $$S(f^{(y)}, f^{(t)})=S^*(-f^{(y)}, -f^{(t)}), \tag{7}$$

because our input signal is real-valued. Hence, we can ignore half the Fourier plane when reconstructing the inverse transform. This is depicted in FIG. 9*c*), where the 1D slice is taken out and transformed back to the spatial domain. Note that, for proper normalization, the inverse transform has multiplied by a factor 2, to account for ignoring the other, conjugate Fourier component. To obtain the amplitude we can a demodulation by shifting a the associated spectral distribution towards DC, $(f_c^{(y)}, f_c^{(t)})=(0, 0)$. Moreover, by performing a cyclic shift, the amplitude estimate $\hat{a}_c(y)$ is obtained retaining its full spatial bandwidth. In practice this may not always be possible, or even be desirable, such that a in the block scheme in FIG. 7, the channel can also be limited in spatial-frequency bandwidth.

The optional windowing, at step 715, prior to the 2D FFT in step 720, can be necessary to avoid border effects, either from the spatial borders (top and bottom of a column) or from temporal borders (begin and end of a column stack).

In general, a physical modulation frequency will not map to an integer apparent spatial or temporal frequency. As a consequence, a specific physical modulation frequency does not appear centered around an integer DFT coefficient. In this case, a demodulating shift of the particular frequency channel needs to be performed on (complex) coefficient values that follow from an interpolation of existing DFT coefficient values. It can be proven that the interpolating filter action can also replace the optional windowing function.

According to an embodiment of the method, the resulting estimate of the analysis above, is utilized to identify the presence and/or the location of one or more light sources in the captured camera frame. This can be done, e.g., by determining the lamp c that locally produces the strongest magnitude response $\hat{a}_c(x, y)$.

Another embodiment provides a more efficient implementation by first combining multiple columns x per frame, the simplest of which is to replace a group of adjacent columns by a new column that contains the row-wise sum of the consecutive pixels along the horizontal direction. The resulting set of amplitude estimates $\hat{a}_c(x, y)$ is provided with a reduced spatial resolution in the horizontal direction. Such horizontal data accumulation largely preserves the modulated-light signal components since the signal phase is constant along image rows. Such column decimation can also be performed on the basis of a so-called wavelet decomposition, which offers an efficient way to (locally) refine the horizontal spatial scale of the accumulation in a recursive fashion. This use of the wavelet transform (and of other methods for hierarchic multi-scale decomposition) is known.

Figure 10:
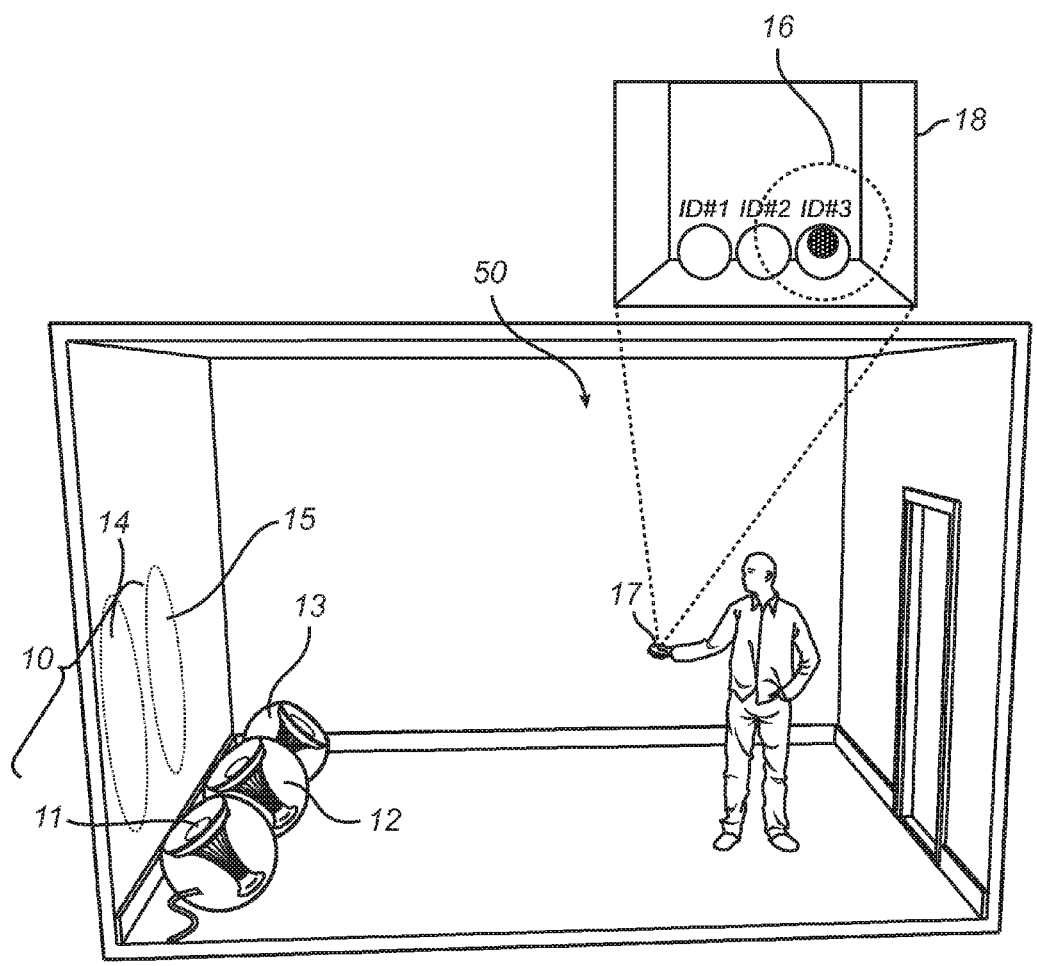
FIG. 10 is a schematic illustration of an embodiment of a light detection system according to the present inventive concept.

With reference to FIG. 10, an exemplifying light detection system according to the present inventive concept is illustrated. An illumination system 10 is installed in a structure 50, here being a room. The illumination system 10 comprises three light sources 11, 12, and 13, and one or more control units (not shown) for controlling the light sources 11, 12, 13. In FIG. 10 a handheld light detection device 17, comprising a rolling shutter camera, is operated by a user. During operation the individually provided light output $I_{11}$, $I_{12}$, $I_{13}$, from each light source 11, 12, 13, respectively, contributes to the total light out of the illumination system for illumination of the structure 10. The illumination contributions from the various light sources 11, 12, 13 on the structure are here illustrated as footprints 14, 15. Footprints from the light sources may overlap. Further, as illustrated in FIG. 10, direct light for light source 13 is imaged in an area denoted as 16 in an acquired image 18. Each light source is coded such that its light output/comprises an individual identifier code ID#1-3, which is typically an embedded code emitted as a temporal sequence of modulations in the characteristics of the light emitted from the individual light source. The Coded Light may further comprise other information regarding the light source like current light settings and/or other information, but for sake of simplicity, only identifier codes in the form of individual modulation frequencies are discussed herein under to illustrate the basic idea of the inventive concept.

There are various techniques for embedding a code into the light output of a light source which are known to people skilled in the art and, therefore, are not described here in detail.

Figure 11:
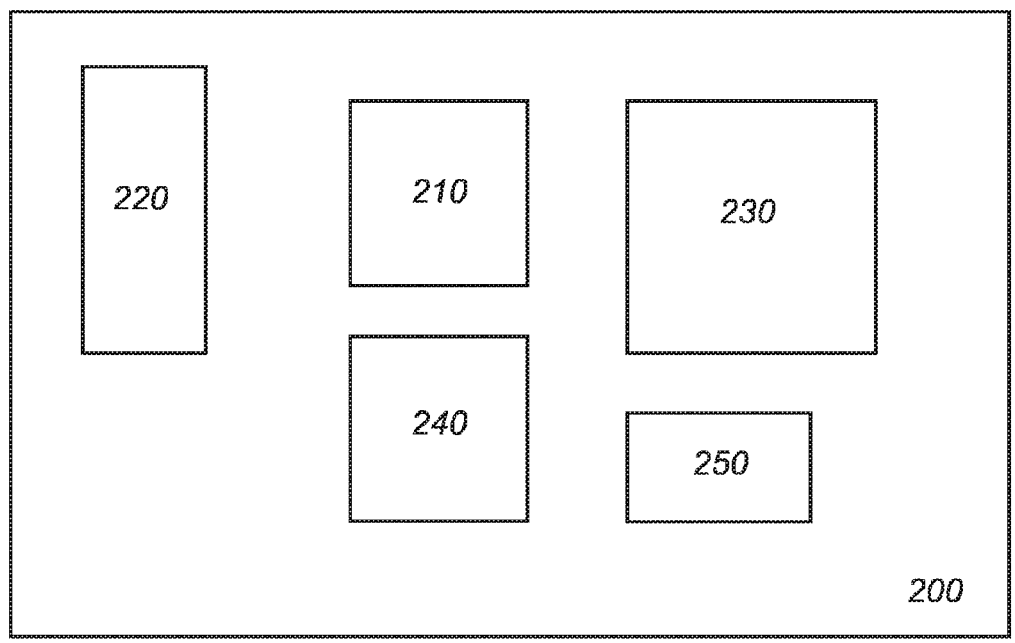
FIG. 11 is schematic block scheme illustrating an embodiment of a light detection system according to the present inventive concept.

To continue, the light detection device 17 is part of a light detection system according to the present inventive concept, which is schematically illustrated in FIG. 11. The light detection system 200 comprises an a rolling shutter camera 210 for acquiring a set of images of a scene, that is, in this exemplifying embodiment, a set of images of an area of the structure 100, towards which the light detection device 17 is pointed by the user. Further, the light detection system comprises a control unit 220 for selecting image acquiring settings, like for instance at least one of a frame rate, line rate, timing, exposure time, and exposure area of rolling shutter camera. The light detection system 200 further comprises a processing unit 230, and optionally a memory 240. The light detection system may further, optionally, comprise a communication unit 250 arranged for providing instructions to the illumination system, and/or for receiving or transmitting information like image acquiring settings or modulation frequencies to the illumination system or other external units. The processing 230 unit is configured to implement a method according to the present inventive concept for processing the data contained in the acquired image (rows of the image) to determine light source identifier codes present at a particular position within the scene. Optionally, images of the scene acquired by a rolling shutter camera may be processed according to the present inventive method in a remotely arranged processing unit.

The processing unit 230 may have access to the modulation frequencies of the light sources, either by communication with the light control system, or an internal or external database of the light detection device (not shown). The light detection system may be arranged to instruct the light control system, to select modulation frequencies adapted to the image acquiring settings of the light detection device. According to an embodiment of the light detection system, it uses prior knowledge of the exposure time of the camera for the selection of frequencies given the frequency-dependent attenuation due to the time integration during exposure, and communicates this information to the light sources for optimal frequency assignment.

Although the light detection system in this exemplifying embodiment is arranged in a hand held light detection device, it may be arranged integrated in the structure, e.g. be wall mounted, or in any other convenient manner. The different parts of the light detection system may be arranged remotely from each other or be integrated in the same light detection device.

Light sources herein may comprise any suitable source of light like a high/low pressure gas discharge source, a laser diode, an inorganic/organic light emitting diode, an incandescent source, or a halogen source.

The light modulation of light sources is performed in a repetitive fashion. There are various modulation methods for Coded Light, continuous and binary, and may include one of a continuous repetitive data-stream, a packetized data stream, with packets at regular intervals, and a packetized data stream, with packets at irregular intervals.

The method according to the present inventive concept is applicable for different modulation techniques of the light sources, e.g. frequency shift keying (FSK), frequency division multiplexing (FDM), orthogonal frequency division multiplexing (OFDM).

In the description above, the inventive concept is described with reference to, but should not be limited to, the application of low-cost cameras for the detection of Coded Light sources. Within the limitations of low-cost cameras as part of existing products (like smart-phones) various measures have been presented to improve detection (short exposure time, intentional defocusing). As rolling shutter sensors continue to be more cost effective than global-shutter sensors, customized cameras may be made part of the lighting system itself, either as sensing element in a handheld device or as part of a permanent light detection system.

Above, embodiments of the light detection system according to the present invention as defined in the appended claims have been described. These should be seen as merely non-limiting examples. As understood by a skilled person, many modifications and alternative embodiments are possible within the scope of the invention.

It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:

1. A method for detecting modulated light comprising:
   receiving a set of images of a scene being illuminated by a modulated light source, said set of images acquired by means of a rolling shutter camera having image acquisition settings comprising a frame rate, $f_{frame}$, and a line rate, $f_{line}$;
   identifying, via a processing unit in a light detection system, in consecutive frames of said set of images acquired from said rolling shutter camera
   a pattern governed by the ratio between a modulation frequency, $f_c$, of a modulated light source and the line rate, $f_{line}$, and
   between consecutive frames a spatial shift of said pattern governed by the ratio between said modulation frequency $f_c$, and said frame rate, $f_{frame}$; and
   providing, via said processing unit in said light detection system, based on said pattern and spatial shift thereof, an estimate of the modulated light amplitude from said light modulated source.

2. A method according to claim 1, further comprising selecting said image acquisition settings and said modulation frequency $f_c$ of said modulated light source to provide a detectable spatial shift of said pattern.

3. A method according to claim 2, wherein said step of selecting is based on predetermined detectable zones or frequency channels selected in a domain of apparent spatial and temporal frequencies.

4. A method according to claim 1, wherein said step of identifying further comprises:
   identifying a plurality of said patterns, each corresponding to a respective modulated light source; and
   comparing identified patterns and/or identified shifts of patterns to distinguish between patterns corresponding to separate modulated light sources.

5. A method according to claim 1, wherein said modulation frequency, $f_c$, of a respective light source is a fixed unique frequency, is selected from a set of candidate frequencies, comprises a set of candidate frequencies applied simultaneously, or is selected from a set of candidate frequencies according to a given sequence.

6. A method according to claim 1, wherein said modulation frequency, $f_c$, is selected to provide optimal spatiotemporal separation of the recorded image pixel intensities from a static background, and/or to provide optimal spatiotemporal separation of the recorded image pixel intensities or image processing derivates thereof, for multiple light sources with respect to each other.

7. A method according to claim 1, wherein said step of providing an estimate of the modulated light further comprises for at least two consecutive frames:
   subdividing each image in a predetermined fashion into one or more spatial regions;

for each one of said spatial regions, integrating intensity values of predetermined pixels in said spatial region in a horizontal direction to create a region-specific and frame-specific value array; and creating a region-specific value-array stack by stacking frame-specific and region-specific value arrays of said spatial region, such that said region- specific value-array stack provides a spatiotemporal representation of the true temporal modulation of the modulated light from a light source which is imaged within said region;

wherein said spatiotemporal analysis is based on the spatial and temporal characteristics of an intensity pattern in said region or regions.

8. A method according to claim 1, when a current exposure time $T_{exp}$ of said rolling shutter camera is known, said step of providing an estimate of said modulated light further comprising:

performing a correction for frequency dependent attenuation due to time integration during exposure in said acquired images.

9. A method according to claim 1, wherein said light modulation is performed in a repetitive fashion, being one of a continuous repetitive data-stream, a packetized data stream, with packets at regular intervals, and a packetized data stream, with packets at irregular intervals.

10. A method according to claim 2, when used in a light detection system comprising a rolling shutter camera for acquiring said images of at least one modulated light source, wherein said image acquiring settings are provided by performing a calibration of said rolling shutter camera, or are retrieved from an internal or external database of the rolling shutter camera.

11. A method according to claim 10, wherein said step of selecting modulation frequencies and image acquiring settings further comprises:

exchanging information concerning at least one current image acquiring setting and/or at least one current modulation frequency between said rolling shutter camera and said at least one light source, or a control system of the light source, wherein said selection is performed based on at least one current image acquiring setting or current modulation frequency.

12. A light detection device comprising a rolling shutter camera being arranged for acquiring a set of images of a scene being illuminated by an illumination system, said illumination system comprising at least a first modulated light source, and processing means arranged for performing a method for detecting modulated light comprising:

receiving the set of images acquired by the rolling shutter camera having image acquisition settings comprising a frame rate, $f_{frame}$, and a line rate, $f_{line}$;

identifying in consecutive frames of said images
a pattern governed by the ratio between a modulation frequency, $f_c$, of a modulated light source and the line rate, $f_{line}$, and
between consecutive frames a spatial shift of said pattern governed by the ratio between said modulation frequency $f_c$, and said frame rate, $f_{frame}$; and
providing based on said pattern and spatial shift thereof, an estimate of the modulated light amplitude from said light source.

13. A method for detecting modulated light comprising:
receiving a set of images of a scene being illuminated by a modulated light source, said set of images acquired by means of a rolling shutter camera having image acquisition settings comprising a frame rate, $f_{frame}$, and a line rate, $f_{line}$;
identifying, via a processing unit in a light detection system, in consecutive frames of said set of images acquired from said rolling shutter camera
a pattern governed by the ratio between a modulation frequency, $f_c$, of a modulated light source and the line rate, $f_{line}$, and
between consecutive frames a spatial shift of said pattern governed by the ratio between said modulation frequency $f_c$, and said frame rate, $f_{frame}$; and
providing, via said processing unit in said light detection system, an estimate of the modulated light amplitude from said light modulated source.

14. A method for detecting modulated light comprising:
receiving a set of images of a scene being illuminated by a modulated light source, said set of images acquired by means of a rolling shutter camera having image acquisition settings;
providing, via a processing unit in a light detection system, an estimate of the modulated light amplitude from said light modulated source, wherein said step of providing an estimate of the modulated light further comprises for at least two consecutive frames:
subdividing each image in a predetermined fashion into one or more spatial regions;
for each one of said spatial regions, integrating intensity values of predetermined pixels in said spatial region in a horizontal direction to create a region-specific and frame-specific value array; and
creating a region-specific value-array stack by stacking frame-specific and region-specific value arrays of said spatial region, such that said region- specific value-array stack provides a spatiotemporal representation of the true temporal modulation of the modulated light from a light source which is imaged within said region;
wherein said spatiotemporal analysis is based on the spatial and temporal characteristics of an intensity pattern in said region or regions.

* * * * *